United States Patent [19]

Takizawa et al.

[11] Patent Number: 5,123,742
[45] Date of Patent: Jun. 23, 1992

[54] LASER LENGTH MEASURING INSTRUMENT

[75] Inventors: Hideo Takizawa, Kanagawa; Kyo Suda, Hachioji; Kenji Aiko, Kanagawa, all of Japan

[73] Assignee: Hitachi Electronics Engineering Co., Ltd., Tokyo, Japan

[21] Appl. No.: 533,342

[22] Filed: Jun. 5, 1990

[30] Foreign Application Priority Data

Jun. 7, 1989 [JP] Japan ................................. 1-144443
Feb. 22, 1990 [JP] Japan ................................. 2-42070
Feb. 22, 1990 [JP] Japan ................................. 2-42071

[51] Int. Cl.[5] ................................................ G01B 11/02
[52] U.S. Cl. ................................................... 356/358
[58] Field of Search ................ 356/345, 350, 358, 356

[56] References Cited

U.S. PATENT DOCUMENTS 4,881,815 11/1989 Sommargren ........................ 356/358

Primary Examiner—Samuel A. Turner
Assistant Examiner—LaCharles P. Keesee
Attorney, Agent, or Firm—Fay, Sharpe, Beall, Fagan, Minnich & McKee

[57] ABSTRACT

A laser length measuring instrument in which a first and a second sinusoidal wave interference signals differing in phase by $\pi/2$ are generated from a plurality of interference wave signals received from an interferometer; a plurality of third sinusoidal wave interference signals differing in phase by $m\pi/2$ n (where n=integer 2 or greater; m=positive integer sequentially selected from among $0 < m\pi/2n < \pi$) with respect to the first sinusoidal wave interference signal are generated out of the first and the second sinusoidal wave interference signals in a phase difference signal generating circuit; a signal indicating the polarity inversion of each sinusoidal wave interference signal is generated, out of the plurality of third sinusoidal wave interference signals generated therein, and the first and the second sinusoidal wave interference signals, utilizes a polarity inversion signal generating circuit to render the signal indicating the polarity inversion corresponding to either first or second sinusoidal wave interference signal into a first measuring signal, and the signal indicating a plurality of polarity inversions respectively corresponding to the plurality of third sinusoidal wave interference signals, and the first and the second sinusoidal wave interference signals into a second measuring signal. The two kinds of measuring signals are combined for measuring purposes to suppress the accumulation of errors affecting the results of measurement in order to obtain accurate, high-resolution displacement measuring data which is hardly affected by signal detection errors on the whole.

11 Claims, 13 Drawing Sheets

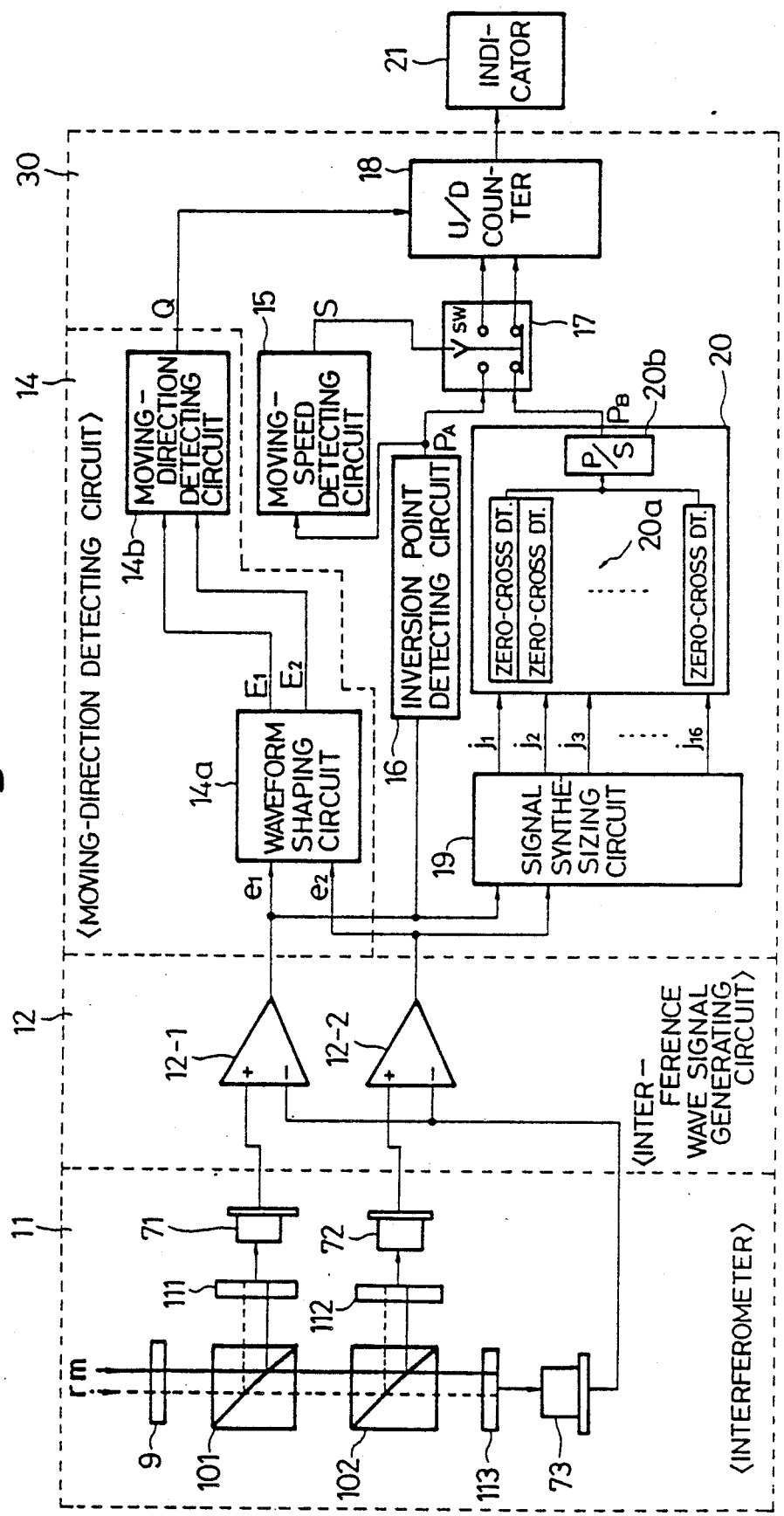

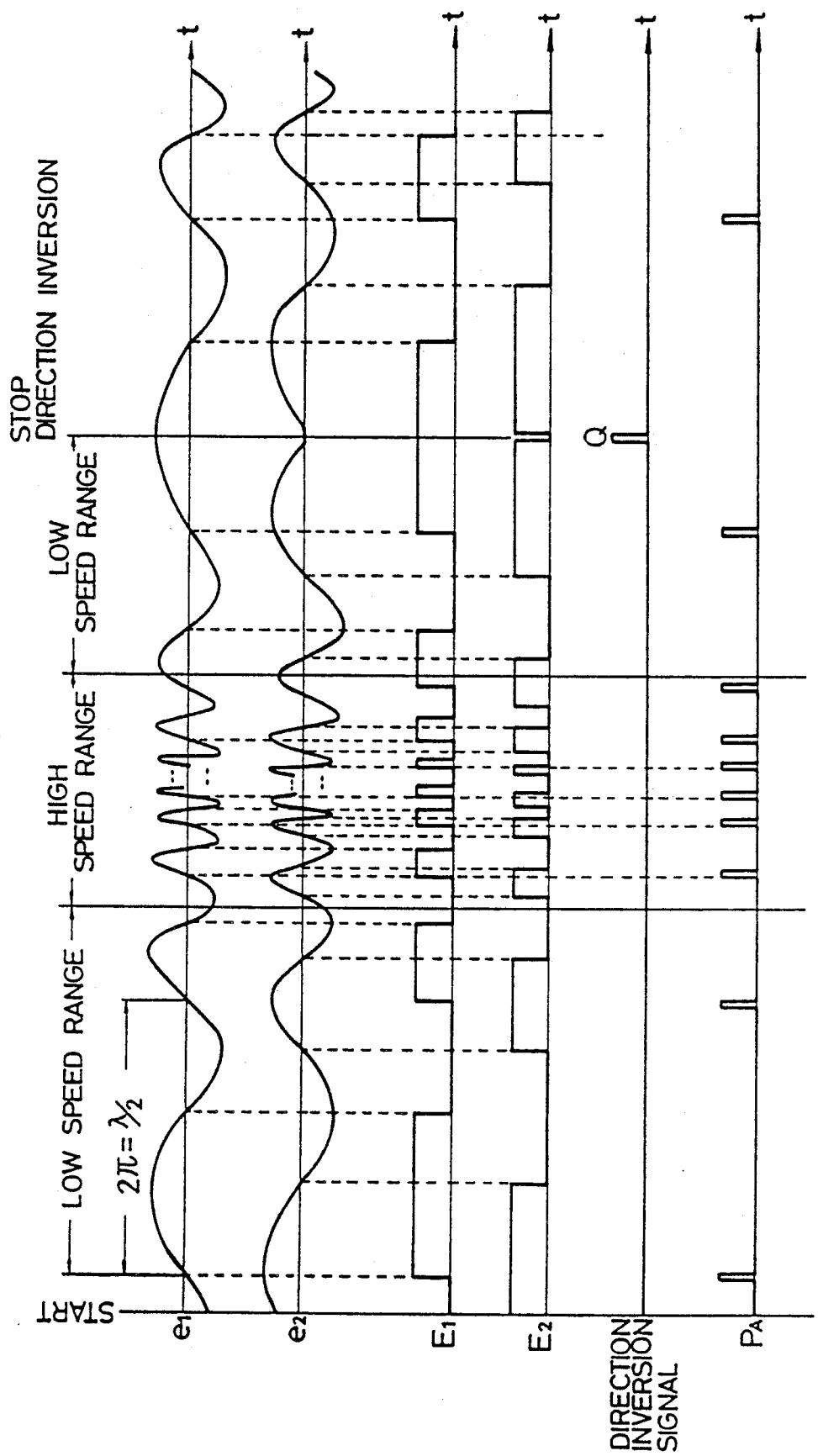

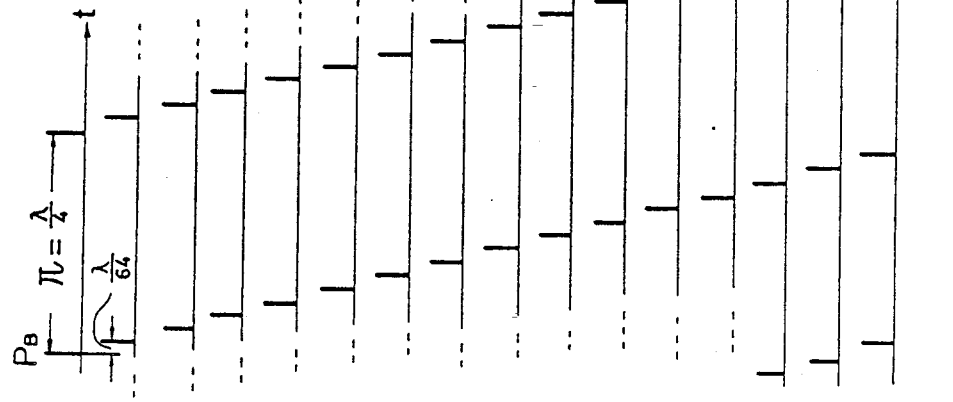
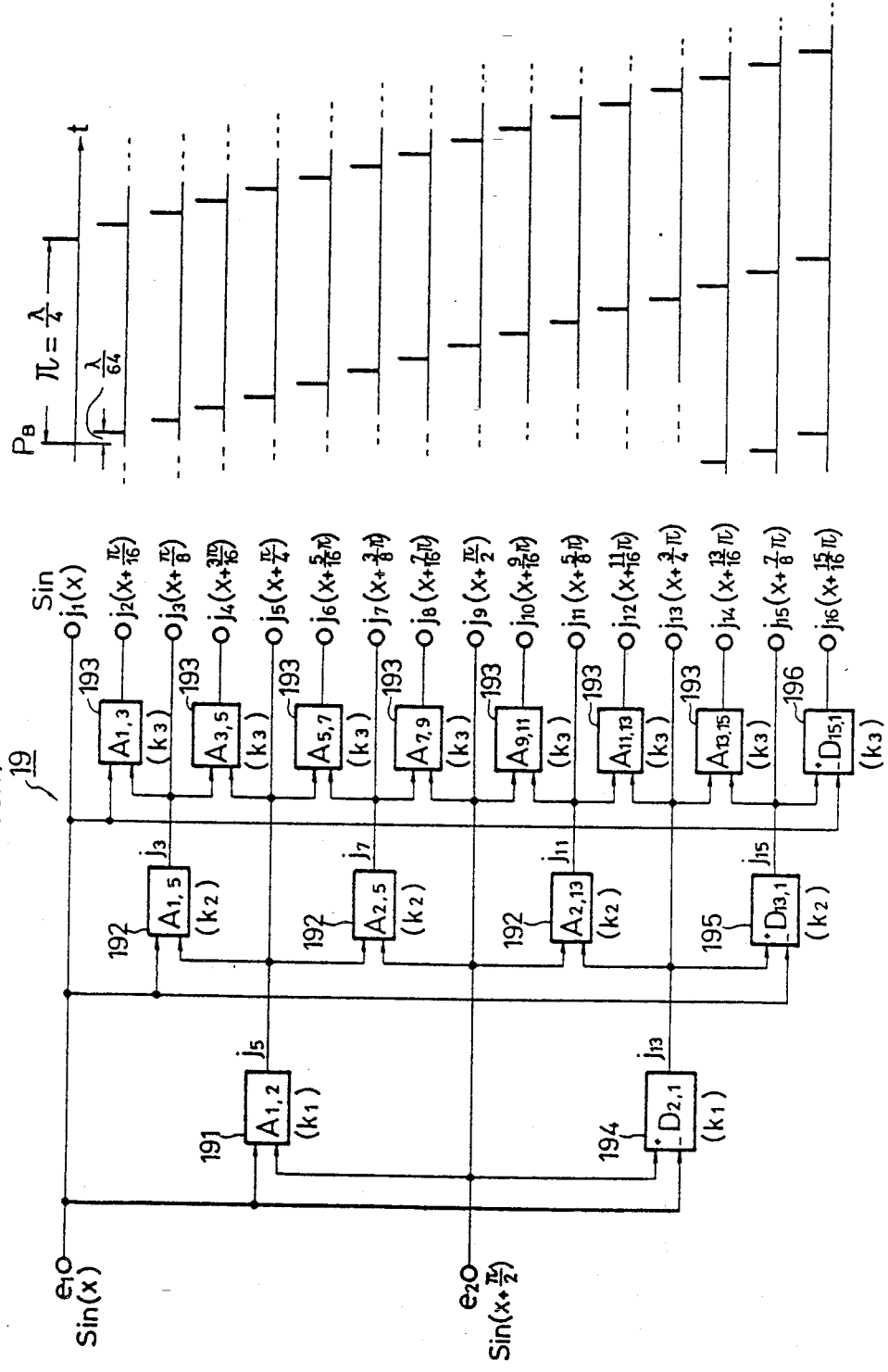

Fig. 4($b_1$)
(i) ADDER
191, 192, 193
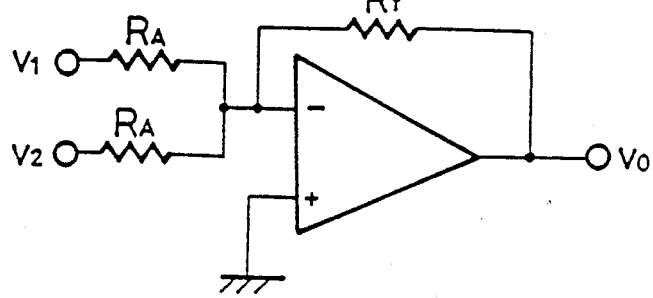
$$V_0 = -\frac{R_A}{R_f}(V_1 + V_2)$$
$$= -k(V_1 + V_2)$$
Fig. 4($b_2$)
(ii) SUBTRACTER
194, 195, 196
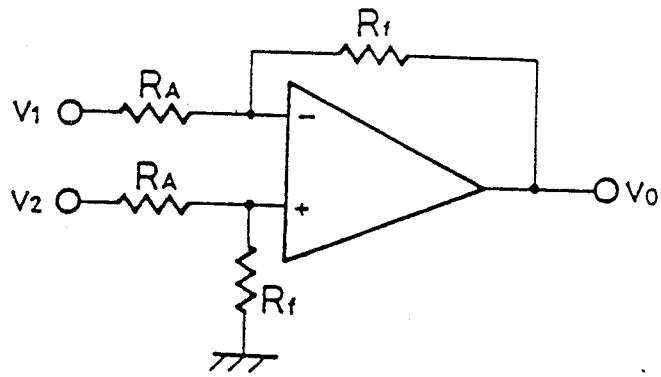
$$V_0 = \frac{R_A}{R_f}(V_2 - V_1)$$
$$= k(V_2 - V_1)$$

Fig. 6

| STATE | NO. | I0 | I1 | I2 | I3 | I4 | I5 | I6 | I7 | I8 | I9 | I10 | I11 | I12 | I13 | I14 | I15 | D4 | D3 | D2 | D1 | D0 | RESOLUTION |
|---|---|---|---|---|---|---|---|---|---|---|---|---|---|---|---|---|---|---|---|---|---|---|---|
| NORMAL | 0 | 1 | 1 | 1 | 1 | 1 | 1 | 1 | 1 | 1 | 1 | 1 | 1 | 1 | 1 | 1 | 1 | 0 | 0 | 0 | 0 | 0 | λ/64 |
| NORMAL | 1 | 1 | 1 | 1 | 1 | 1 | 1 | 1 | 1 | 1 | 1 | 1 | 1 | 1 | 1 | 1 | 0 | 0 | 0 | 0 | 0 | 1 | λ/64 |
| NORMAL | 2 | 1 | 1 | 1 | 1 | 1 | 1 | 1 | 1 | 1 | 1 | 1 | 1 | 1 | 1 | 0 | 0 | 0 | 0 | 0 | 1 | 0 | λ/64 |
| NORMAL | 3 | 1 | 1 | 1 | 1 | 1 | 1 | 1 | 1 | 1 | 1 | 1 | 1 | 1 | 0 | 0 | 0 | 0 | 0 | 0 | 1 | 1 | λ/64 |
| NORMAL | 4~31 | OMITTED | | | | | | | | | | | | | | | | | | | | | |
| ABNORMAL (A) | 0 | 1 | X | 1 | X | 1 | X | 1 | X | 1 | X | 1 | X | 1 | X | 1 | X | 0 | 0 | 0 | 0 | 0 | λ/32 |
| ABNORMAL (A) | 1 | 1 | X | 1 | X | 1 | X | 1 | X | 1 | X | 1 | X | 1 | X | 1 | X | 0 | 0 | 0 | 0 | 0 | λ/32 |
| ABNORMAL (A) | 2 | 1 | X | 1 | X | 1 | X | 1 | X | 1 | X | 1 | X | 1 | X | 0 | X | 0 | 0 | 0 | 1 | 0 | λ/32 |
| ABNORMAL (A) | 3 | 1 | X | 1 | X | 1 | X | 1 | X | 1 | X | 1 | X | 1 | X | 0 | X | 0 | 0 | 0 | 1 | 0 | λ/32 |
| ABNORMAL (A) | 4~31 | AS STATED ABOVE | | | | | | | | | | | | | | | | | | | | | |
| ABNORMAL (B) | 0~3 | 1 | X | X | X | 1 | X | X | X | 1 | X | X | X | 1 | X | X | X | 0 | 0 | 0 | 0 | 0 | λ/16 |
| ABNORMAL (B) | 4~7 | 1 | X | X | X | 1 | X | X | X | 1 | X | X | X | 0 | X | X | X | 0 | 0 | 1 | 0 | 0 | λ/16 |
| ABNORMAL (B) | 8~11 | 1 | X | X | X | 1 | X | X | X | 0 | X | X | X | 0 | X | X | X | 0 | 1 | 0 | 0 | 0 | λ/16 |
| ABNORMAL (B) | 12~15 | 1 | X | X | X | 0 | X | X | X | 0 | X | X | X | 0 | X | X | X | 1 | 0 | 0 | 0 | 0 | λ/16 |
| ABNORMAL (B) | 16~31 | AS STATED ABOVE | | | | | | | | | | | | | | | | | | | | | |
| ABNORMAL (C) | 0~7 | 1 | X | X | X | X | X | X | X | 1 | X | X | X | X | X | X | X | 0 | 0 | 0 | 0 | 0 | λ/8 |
| ABNORMAL (C) | 8~15 | 1 | X | X | X | X | X | X | X | 0 | X | X | X | X | X | X | X | 0 | 1 | 0 | 0 | 0 | λ/8 |
| ABNORMAL (C) | 16~31 | AS STATED ABOVE | | | | | | | | | | | | | | | | | | | | | |

LASER LENGTH MEASURING INSTRUMENT

BACKGROUND OF THE INVENTION

1. Technical Field

The present invention relates to laser length measuring instruments and more particularly to a laser length measuring instrument for measuring the displacement of a moving object by counting up interference fringes according to interference wave signals detected by an interferometer in such a manner as to prevent count errors from accumulating to ensure high precision measurement.

2. Prior Art

Laser length measuring instruments are capable of measuring the displacement of moving objects with resolution of the order of wavelength by utilizing the interference phenomena of laser beams. FIG. 1 shows the basic configuration of an interferometer in a laser length measuring instrument.

In FIG. 1, numeral 10 denotes an interferometer in which a laser beam 1a generated from a semiconductor diode as a laser beam source (LD) 1 is received by a beamsplitter 2 where it is divided into a measuring beam m and a reference beam r. The measuring beam m is reflected from a measuring mirror 4 fitted to a moving object 5 and returns to the beamsplitter 2. The reference beam r is reflected from a reference mirror 3 fixed at a predetermined position in the interferometer 10 and passes through the beamsplitter 2 where it is combined with the measuring beam.

Since a laser beam has coherence in general, the beam synthesization results in the generation of an interference wave 6 as stated above. Given that the wavelength of the laser beam 1a is $\lambda$, the pitch of interference fringes of the interference wave 6 is $\lambda/2$.

While the measuring mirror 4 remains stationary, the interference wave 6 also stands still. If the measuring mirror 4 moves (because of the moving object 5), the interference wave also moves accordingly. An interference wave signal 6a in the form of an electric signal which changes with time as the object 5 moves can thus be obtained by applying the interference wave 6 to a light receiver 7.

By applying the interference wave signal 6a to a comparator to examine the signal with the base level as a reference, the interference wave signal 6a can be converted into a corresponding pulse. The number of pulses of the pulse waveform is proportional to the displacement $\delta x$ of the measuring mirror 4. Therefore, the displacement $\delta x$ of the moving object 5 can be measured with resolution corresponding to the wavelength ($=\lambda/2$) of the interference wave signal 6a by counting the pulses.

The precision of electronic parts such as semiconductors is being increasingly improved. As a result, laser length measuring instruments for use in manufacturing or inspecting electronic parts are required to be capable of measuring a displacement less than what is of the order of wavelength of an ordinary laser diode. Although the direction in which the object 5 moves has been left unidentified in the description given above, even that direction is desired to be determinable. The present applicant has made an invention that can meet such requirements and applied for a patent (Japanese Patent Laid-Open No. 35303/1989). This invention has substantially the same contents as shown in FIGS. 2(a), (b). In FIG. 2(a), numeral 11 refers to an interferometer, 12 to an interference wave signal generating circuit, and 13 to an interference fringe counting circuit.

The interferometer 11 has a polarizing beamsplitter 8 (corresponding to the beamsplitter of FIG. 1 with the omission of the reference and the measuring mirror 3, 4 in FIG. 2) and causes a linear polarizing laser beam 1b produced by a laser beam source (not shown) to be incident on the polarizing beamsplitter 8. As in the case of FIG. 1, the polarizing beamsplitter 8 divides the laser beam 1b into a measuring beam and a reference beam r; these beams are respectively reflected from the measuring mirror 4 and the reference mirror 3 before being returned to the polarizing beamsplitter 8. At this time, the measuring beam m and the reference beam r are incident on a $\lambda/4$ plate 9 without interfering with each other as their polarizing directions are different.

While passing through the $\lambda/4$ plate 9, each beam is converted into a circularly polarized light wave, whereby interfering waves of the measuring and the reference beam m, r are generated. The interference wave is divided by two nonpolarizing beamsplitters 101, 102 into three. The divided interference waves are passed through linear analyzers 111, 112, 113 in the directions which differ in phase by $\pi/2$ with respect to the luminous planes and sent to light receivers 71, 72, 73, respectively. As a result, interference wave signals corresponding to the interference waves detected by the respective linear analysers 111, 112, 113 are generated in the respective light receivers 71, 72, 73.

On receiving the three interference wave signals differing in phase by $\pi/2$, the interference wave signal generating circuit 12 makes one of the signals a reference signal and the other two signals comparative signals, and applies these signals to subtracter circuits 121, 122 as shown in FIG. 2(a). The subtracter circuits 121, 122 consequently output two interference wave signals $e_1$, $e_2$ differing in phase by $\pi/2$ as shown in FIG. 2(b).

As shown in FIG. 2(b), the interference wave signals $e_1$, $e_2$ become sinusoidal wave interference signals $e_1$, $e_2$ ($e_2$=sinusoidal wave differing in phase by $+\pi/2$ from the signal $e_1$).

The signals $e_1$, $e_2$ are subsequently applied to the interference fringe counting circuit 13. The interference fringe counting circuit 13 determines the polarities of the signals $e_1$, $e_2$ to be $+$ or $-$ with the base level as a reference value. The results thus determined are shown with $+$, $-$ under the signals $e_1$, $e_2$ in the respective intervals I–IV.

The interference fringe counting circuit 13 determines the direction of movement by reference to the relation between the polarities of both signals and produces moving-direction signals. As shown in FIG. 2(b), there are two points at which the polarity inversion of each interference signal occurs every period. The interference fringe counting circuit 13 detects zero-cross points as polarity inversion points of the signals $e_1$, $e_2$, for instance, and counts the pulses thus detected by means of a counter. In this way, the displacement $\delta x$ of the moving object 5 can be measured with a resolution of $\lambda/8$ with respect to the wavelength of the laser beam.

The present applicant has also made an invention for further resolution improvement and applied for a patent (Japanese Patent Laid-Open No. 184402/1989). In this invention, the number of beamsplitters of the interferometer shown in FIG. 2(a) is increased to three, instead of the two shown (101, 102), to divide the interference wave into four. These interference waves are passed through respective analyzers whose polarizing planes differ by $\pi/4$ to cause the generation of interference wave signals differing in phase by $\pi/4$. These four interference wave signals are, as shown in FIG. 2(c), sinusoidal wave interference signals $e_a$, $e_b$, $e_c$, $e_d$ sequentially differing in phase by $\pi/4$. As there are two polarity inversion points every period for each, the resolution with respect to the displacement $\delta x$ of the moving object 5 can be raised to $\lambda/16$ by detecting the polarity inversion points likewise and counting the pulses thus detected.

As is obvious from the principle, it is possible to improve the resolution by increasing the number of beamsplitters to increase the number of divided interference waves and to decrease the phase difference therebetween. However, the use of the optical method for dividing the interference wave by means of the beamsplitter tends to make the optical system configuration extremely complicated and therefore to render the adjustment of the optical axis and the like difficult.

Moreover, the frequency of the interference wave signal is proportional to the speed of the moving unit; the higher the speed, the higher the frequency becomes. The frequency becomes proportionally higher when the resolution is increased. As the frequency rises, the occurrence of a measurement error is induced under the influence of noise and the like. The conventional measuring system has the further disadvantage of causing errors in measuring data to be accumulated when a measurement error occurs because the pulses corresponding to the interference fringes are additive. As a result, frequency of error in the pulse for detecting the interference fringe increases when the resolution is improved and this results in decreasing the reliability of the measured value.

The principle in the semiconductor laser length measuring instrument using an interferometer relies on causing the generation of the interference waves through the interference of the measuring beam with the reference beam. The interference wave then becomes most clarified when both the beams have the same wavelength. However, the laser beam generated by a semiconductor laser is such that the frequency fluctuates and becomes irregular; consequently, it has a certain breadth with respect to the central wavelength generated. If the interference wave is divided into pieces, the relation of one to another tends to become unclear and resolution becomes difficult to improve.

SUMMARY OF THE INVENTION

An object of the present invention is to provide a laser length measuring instrument capable of improving resolution by causing the generation of many interference wave signals differing in phase as prearranged without using a beamsplitter.

Another object of the present invention is to provide a laser length measuring instrument capable of obtaining a reliable measured value with high resolution while preventing errors from accumulating.

Still another object of the present invention is to provide a laser length measuring instrument capable of obtaining a reliable measured value by selecting resolution in accordance with the speed of a moving object.

A further object of the present invention is to provide a laser length measuring instrument capable of causing the stable generation of many interference wave signals differing in phase as prearranged by stabilizing the wavelength of a beam from a laser beam source, using an electronic circuit.

In order to accomplish the foregoing objects, the laser length measuring instrument according to the present invention comprises an interferometer for receiving laser beams, a phase difference signal generating circuit having an addition circuit and a subtraction circuit, a polarity inversion signal generating circuit, and a displacement generating circuit. First and second sinusoidal wave interference signals differing in phase by $\pi/2$ are generated from a plurality of interference wave signals received from the interferometer. A plurality of third sinusoidal wave interference signals differing in phase by $m\pi/2n$ (where n=integer 2 or greater; m=positive integer sequentially selected from among $0 < m\pi/2n < \pi$) with respect to the first sinusoidal wave interference signal are generated out of the first and the second sinusoidal wave interference signals in the phase difference signal generating circuit. A signal indicating the polarity inversion of each sinusoidal wave interference signal is further generated, out of the plurality of third sinusoidal wave interference signals thus generated in the phase difference signal generating circuit, and the first and the second sinusoidal wave interference signals, in a polarity inversion signal generating circuit. The displacement generating circuit is caused to receive the signal obtainable according to either the first or the second sinusoidal wave interference signal from the sinusoidal wave interference signals generated therein, the signal having a first resolution with respect to the measuring displacement of a moving object and indicating the polarity inversion, independently of the signal obtainable respectively according to the first and the second sinusoidal wave interference signal and the plurality of third sinusoidal wave interference signals, and the signal having a second resolution higher than the first resolution with respect to the measuring displacement thereof and indicating the polarity inversion, whereby the displacement of the moving object is measured in conformity with the resolution indicated by the signals thus received.

In this way, there are formed two kinds of measuring signals: a first measuring signal with respect to the two sinusoidal wave interference signals differing in phase by $\pi/2$, and a second measuring signal with respect to the sinusoidal wave interference signal that is higher in resolution than the first measuring signal. These two measuring signals differ in not only reliability but also resolution.

In other words, the first measuring signal is formed according to the two interference wave signals differing in phase by $\pi/2$, whereas the second measuring signal is formed according to the interference wave signal formed in the electronic circuit in addition to the two interference wave signals differing in phase by $\pi/2$. The latter interference wave signal formed in the electronic circuit is higher in resolution than the former interference wave signals; however, the reliability of the latter interference wave signal becomes decreased to the extent that it is passed through the electronic circuit.

For the reason stated above, these measuring signals are separately handled in harmony, with the difference in not only resolution but also reliability therebetween and the accumulation of errors affecting measuring results being suppressed by utilizing them in combination. It thus becomes possible to obtain data on the measured displacement with high resolution and accuracy without being frequently affected by errors in detecting signals on the whole.

With regard to the speed of the moving object under measurement, it is gradually accelerated from a start point to reach a predetermined speed, moved at that speed thereafter and then decelerated near a stop point until it stops completely. A measuring method for making accurate the measurement in a low speed portion is such that high resolution measurement is applied to the low speed portion near the start and the stop point. On the other hand, the measurement accuracy is unaffected by high or low resolution measurement in an intermediate area where the speed of the moving object is high, excluding the start and the stop points. In other words, measurement accuracy in the whole interval ranging from the start point to the stop point is determined by measurement accuracy near the start and the stop points.

A description will be given of an example of switching resolution in accordance with measuring speed in a first embodiment to facilitate the understanding of the present invention; that is, displacement is measured with high resolution and accuracy even though errors are more or less allowed to accumulate in the low-speed moving condition near the start and the stop points. The displacement is then measured with low resolution but high reliability in the intermediate high-speed moving condition, whereby the accumulation of errors is reduced. The total displacement of the moving object is practically measured with accuracy by adding up the data obtained in both cases.

BRIEF DESCRIPTION OF THE DRAWINGS

FIGS. 3(a), (b) are a block diagram of a laser length measuring instrument embodying the present invention and a timing chart relating to signals in principal parts for illustrating its operation, respectively.

FIGS. 4(a), (b), ($b_2$), (c) illustrate a signal synthesizing circuit diagram of FIG. 3(a) in detail.

FIG. 6 illustrates the relation between the address allotment to ROM in accordance with abnormal levels and storage data with respect to the ROM as one of the components of the embodiment shown in FIG. 5(a).

DESCRIPTION OF THE PREFERRED EMBODIMENT

Figure 1:
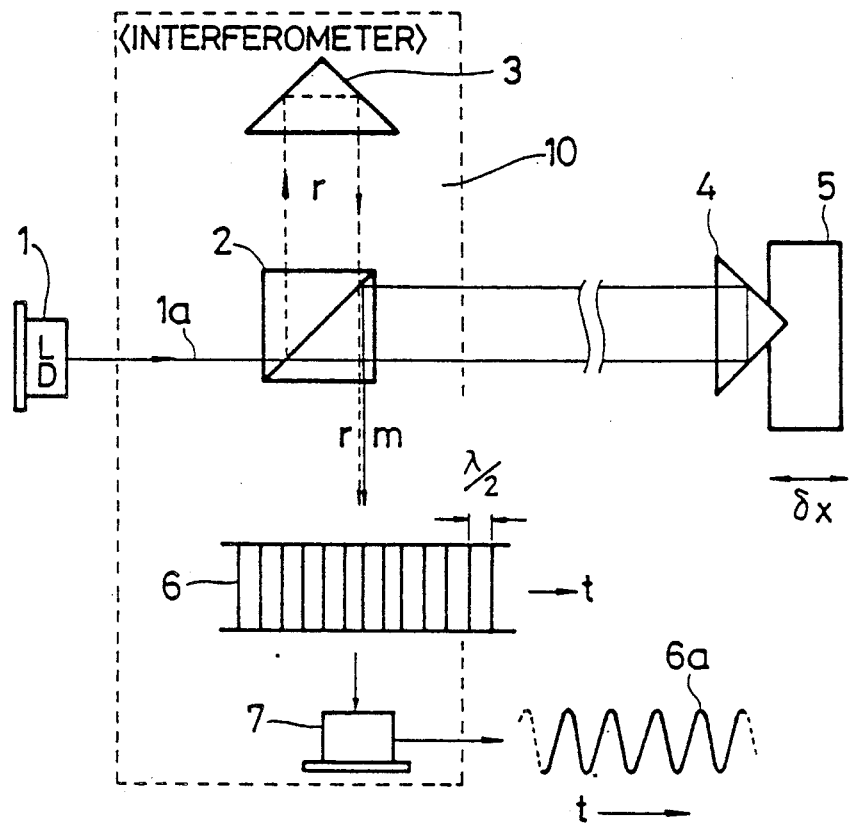
FIG. 1 illustrates a basic configuration of a conventional laser length measuring instrument.
Figure 2A:
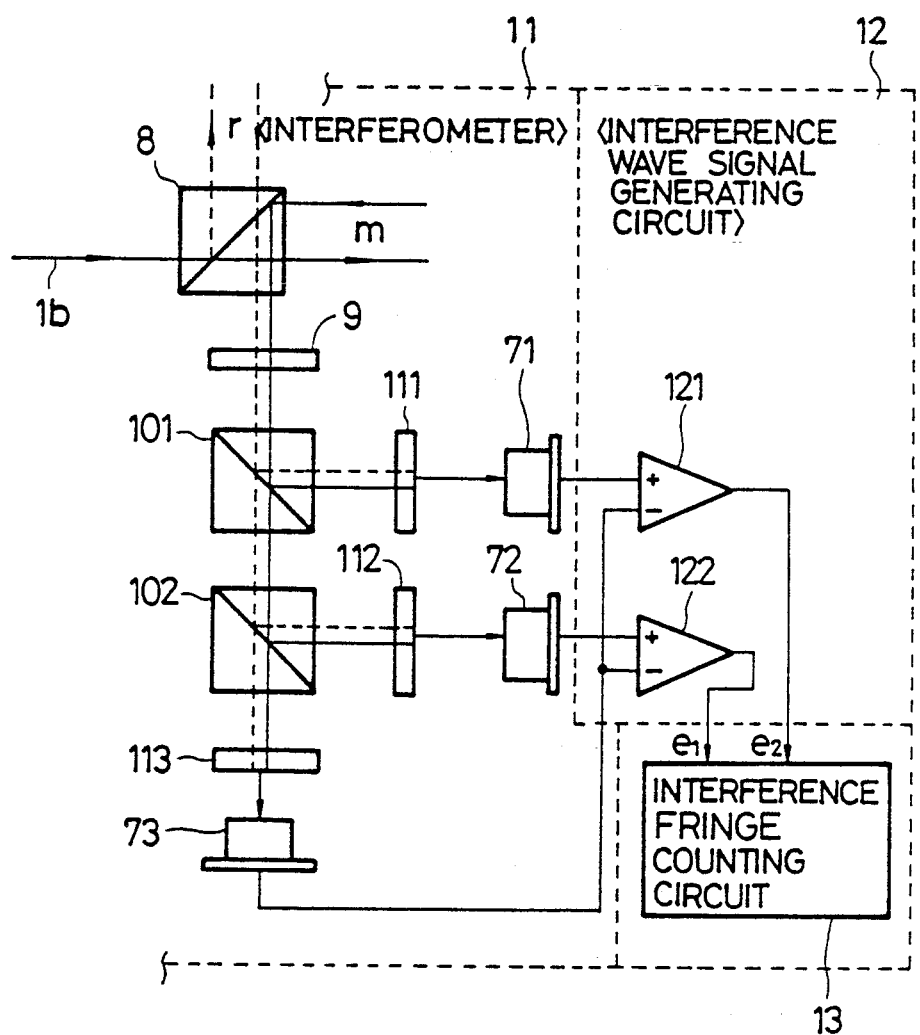
FIGS. 2(a), (b), (c) are a block diagram of a laser length measuring instrument embodying an invention as applied for earlier than the present invention, a performance chart, and an interference wave signal chart, respectively.
Figure 2B:
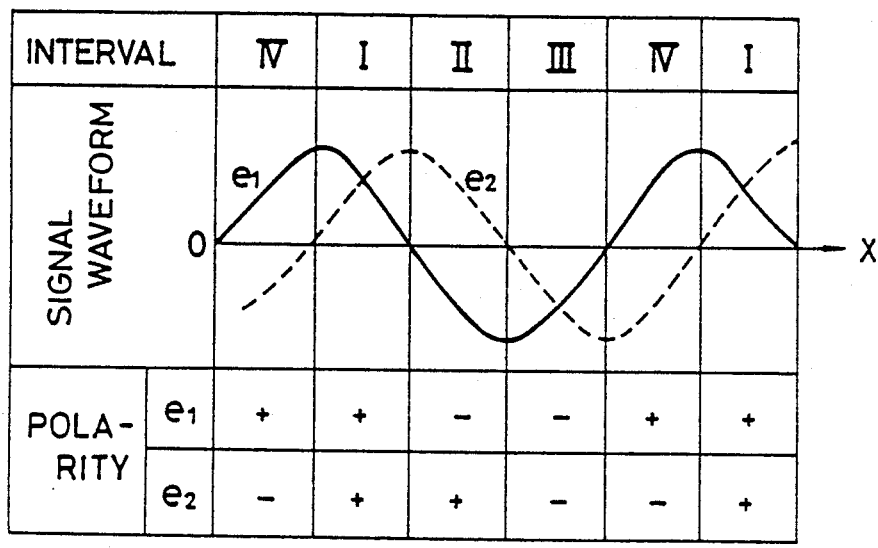
Figure 2C:
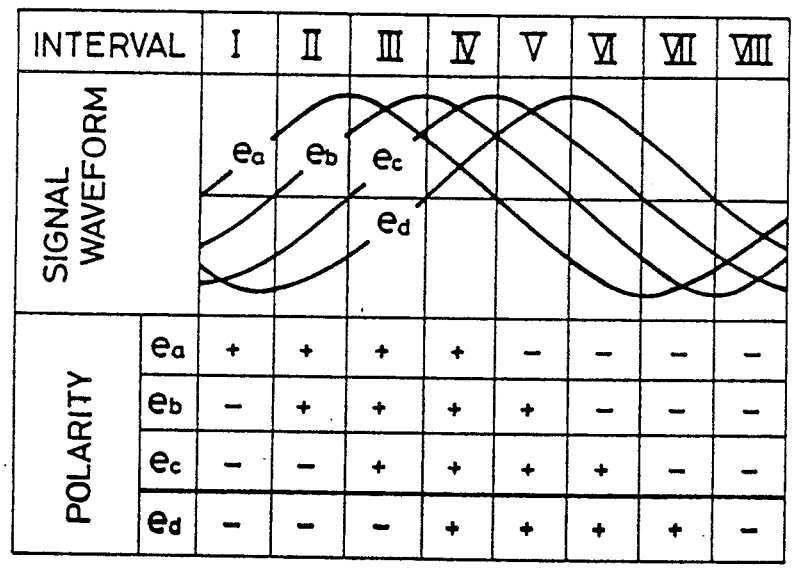

Like reference characters employed in a block diagram of FIG. 2(a) designate like or corresponding component parts of FIG. 3(a) and the description of these component parts will be omitted.

Numeral 30 denotes an interference fringe counting circuit, which receives signals $e_1$, $e_2$ as interference wave signals from the interference wave signal generating circuit 12 of FIG. 2(a). The interference fringe counting circuit 30 comprises a moving-direction detecting circuit 14 and a signal synthesizing circuit 19. The moving-direction detecting circuit 14 comprises a waveform shaping circuit 14a and a moving-direction detecting circuit 14b. The waveform shaping circuit 14a receives the signals $e_1$, $e_2$ and generates the pulses subjected to waveform shaping with the base level of the signal as a reference and with a portion exceeding the reference level as a high level. The resulting pulses are those shown as $E_1$, $E_2$ in FIG. 3(b). The moving-direction detecting circuit 14b receives the pulses $E_1$, $E_2$ and generates a direction inversion signal Q for showing the alteration of the direction of movement. The direction inversion signal Q is applied to an up/down (U/D) counter 18 for changing the count direction from up to down or from down to up alternately.

The U/D counter 18 counts interference fringes in two ways: with low and high resolution. In the case of low resolution, the counter is incremented or decremented in such a manner that the resolution corresponds to high order digits, whereas in the case of high resolution, the counter is incremented or decremented in such a manner that the resolution is positioned at the lowest digit. Errors are thus prevented from accumulating.

As shown in FIG. 3(b), the direction inversion signal Q is detectable when two of the pulses $E_2$ are generated within the range of width of the pulse $E_1$ being generated. When the moving object moves back while it is making a forward movement, the signal $e_1$ is related to the signal $e_2$ as shown in FIG. 3(b).

The signal synthesizing circuit 19 forms, as shown in FIG. 4(a), 16 sinusoidal wave interfering signals $j_1$ - $j_{16}$ (hereinafter simply called $j_1$- $j_{16}$) differing in phase by $\pi/16$ out of the signals $e_1$, $e_2$. A detailed description will be given of its generating circuit later.

These 16 signals $j_1$- $j_{16}$ are sent to a pulse detecting/synthesizing circuit 20 in parallel. The pulse detecting/synthesizing circuit 20 comprises a polarity inversion detecting circuit 20a consisting of 16 zero-cross detecting circuits (zero cross DTs) corresponding to the respective signals $j_1$-$j_{16}$ in parallel and a parallel/serial converter circuit (P/S) 20b for converting pulses PB as signals detected at zero-cross points of the respective signals $j_1$-$j_{16}$ received in parallel to serial ones.

FIG. 4(c) shows the pulses PB of the polarity inversion detecting signals corresponding to the signals $j_1$-$j_{16}$ detected as the zero-cross points by the polarity inversion detecting circuit 20a. There are generated two pulses PB with a period corresponding to a displacement $\lambda/4$ with respect to the displacement $\delta x$ of the moving object 5 every period according to each of the signals $j_1$-$j_{16}$. The parallel/serial converter circuit 20b supplies these pulses PB in the form of serial pulses PB via an OR circuit and the like to a switch circuit (SW) 17. The serial pulse PB is a second measuring signal whose period corresponds to the displacement $\lambda/64$ of the moving object 5.

The serial pulse PB is applied via the changeover switch circuit 17 to the U/D counter 18. A measuring unit amount relative to the minimum count unit of the U/D counter becomes $\lambda/64$ at this time. The resolution becomes $\lambda/64$ accordingly.

Since the signal synthesizing circuit 19 is generating 16 signals $j_1$–$j_{16}$, n=16 (where n=positive integer) in this case. Notwithstanding, the value n may be replaced with another selective value. Consequently, the measuring unit amount relative to the minimum count unit of the U/D counter 18 may be made $\lambda/4n$. The resolution is then $\lambda/4n$ and the displacement of the moving object 5 can be measured with this resolution.

The signal $e_1$ is applied to the polarity inversion detecting circuit 16 comprising the zero-cross detecting circuit and the like. The polarity inversion detecting circuit 16 detects the polarity inversion of the signal $e_1$ and outputs pulses PA shown in FIG. 3(b) as its polarity inversion detecting signals. Each pulse PA is a first measuring signal whose time period corresponds to the interval of the zero-cross point of the signal $e_1$, which corresponds to the fact that resolution with respect to the displacement $\delta x$ of the moving object 5 becomes $\lambda/2$. Therefore, this resolution is lower than what has been stated above.

The pulse PA is applied to the changeover switch circuit 17 and the moving-speed detecting circuit 15. The moving-speed detecting circuit 15 counts the pulses PA for a predetermined period of time. When the count exceeds a preset value, the moving-speed detecting circuit 15 applies a changeover control signal S to the changeover switch circuit 17. The changeover control signal S is held for over a predetermined period of time until the next counting is terminated. In addition, the counter for counting the pulses PA is reset the predetermined period of time later and restarts counting.

On receiving the changeover control signal S, the changeover switch circuit 17 connects the polarity cuts the connection of the pulse detecting/synthesizing circuit 20. As a result, the pulse PA is applied to the U/D counter 18. While receiving no changeover control signal S, the changeover switch circuit 17 keeps connecting the pulse detecting/synthesizing circuit 20 to the U/D counter 18 to have the pulse PB applied to the U/D counter.

The resolution indicated by the pulse PA is $\lambda/2$ in this case. The measuring unit amount with respect to the count unit of the U/D counter 18 becomes $\lambda/2$. The pulse PA is equivalent to 32 pulses PB. The pulse PB increments or decrements the lowest order digit of the U/D counter 18 in accordance with the resolution $\lambda/64$, whereas the pulse PA increments or decrements the 6th digit equivalent to the 32 pulses PB.

Although exaggerated in FIG. 3(b), the moving-speeds of the signals $e_1$, $e_2$ increase as that of the moving object increases and their frequencies also change. The speed of the moving object corresponds to the count of the pulse PA within the predetermined range of time. When the count is not leveled at a predetermined value, the moving object 5 is in such a state that it is moving at low speed from the start point or moving at low speed in the vicinity of the stop point.

While the moving object is moving at low speed from the start point for a predetermined period of time, the U/D counter 18 receives the pulse PB and counts the pulses PB corresponding to $\lambda/64$ and while it is moving at high speed in the intermediate portion, receives the pulse PA to count the pulses PA corresponding to $\lambda/2$.

When the moving object 5 enters into a stationary state and proceeds to the stop point, it moves at low speed, whereby the U/D counter receives the PB pulses again and counts those corresponding to $\lambda/64$.

The value counted by the U/D counter 18 is incremented or decremented according to the movingdirection signal Q in conformity with the direction of movement.

As a result, a measured value corresponding to the displacement of the moving object is given as the value counted by the U/D counter 18. The value thus counted by the U/D counter 18 is supplied to an indicator 21 and data on the overall displacement of the moving object is displayed in real time. Then the values in the U/D counter 18 is sent to the indicator 21 according to the moving-direction signal Q and also displayed on the indicator 21 by the directions of movement.

A description will subsequently be given of the signal synthesizing circuit 19 shown in FIG. 4(a), wherein there are shown adders 191, 192, 193 and subtracters 194, 195, 196. As shown in (i), (ii) of FIGS. 4($b_1$) and 4($b_2$), these adders and subtracters respectively comprise operational amplifiers and are used for resistance addition and difference input difference subtraction by means of resistors RA, RB and feedback resistors Rf. An, m (where n, m=positive integers conforming to accompanying characters for identifying interference signals) shown within the blocks 191, 192, 193 indicate that the sum of signals $e_1$, $e_2$ or that of jn and jm with respect to a signal j produced by the sum of them, are formed; similarly, Dn, m indicate that the difference is formed.

For convenience of illustration, the signal $e_1$ is defined as $\sin(x)$ and the signal $e_2$ as $\sin(x+\pi/2)$ and only the phase relationship is shown on the output side, with the omission of individuals in natations. Moreover, j represents the sinusoidal wave interference signal formed by adding up two signals different in phase or subtracting one from the other. The accompanying characters added to j conform to the number of n when the signal thus formed is represented by $jn = K\sin(x+\pi(n-1)/16)$. K is a coefficient expressed in the form of an amplitude by obtaining the sum of functions of sin and determined by adjusting the gains of the operational amplifiers respectively in the addition and the subtraction circuits, and selecting the resistance values of each therein. This facilitates the acquisition of signals having the same amplitude on the sin side.

The signals $e_1$, $e_2$ as they stand are produced as $j_1(x)$ and $j_9(x+\pi/2)$. Further, these signals are added up by the addition circuit 191 and combined into a signal $j_5(x+\pi/4)$ differing in phase by $\pi/4$, which lies therebetween. Moreover, the signals $e_1$, $e_2$ are subjected to subtraction and combined into a signal $j_{13}(x+3\pi/4)$ differing in phase by $\pi/4$ from $j_{gs}$ and lies therebetween. In the same way, the sinusoidal wave interference signals are added up by the addition subtraction circuits 195, 196. As a result, there are formed 16 signals $j_1$–$j_{16}$ differing in phase, one to the next, by $\pi/16$. In this case, the contents in () indicate phases and x, the displacement of the moving object 5.

$V_1$, $V_2$ of (i), (ii) of FIG. 4($b_1$) and 4($b_2$), denote input voltages; Vo, an output voltage; and k, a constant. In the equations above, RA denotes the resistance value of the resistor RA; and RB, the resistance value of the resistor RB. Given the amplification degrees of the addition circuits 191, 192, 193 as $k_1$, $k_2$, $k_3$ respectively, the overall amplification degree k acts as what has been combined, gives each sinusoidal wave interference signal an accurate phase difference and makes the amplitude constant. Moreover, the amplitude is determined by the ratio of each resistance element RA to Rf. Given these numerical values as $k_1 = \sin(\pi/4)/2$, $k_2 = \sin(3\pi/8)/2$, $k_3 = \sin(7\pi/16)/2$, for instance, sinusoidal wave interference signals substantially having the same amplitude are obtainable. In the case of the subtraction circuits 194, 195, 196, similar results are obtained, provided the amplification degrees are assumed $k_1$, $k_2$, $k_3$.

Figure 5A:
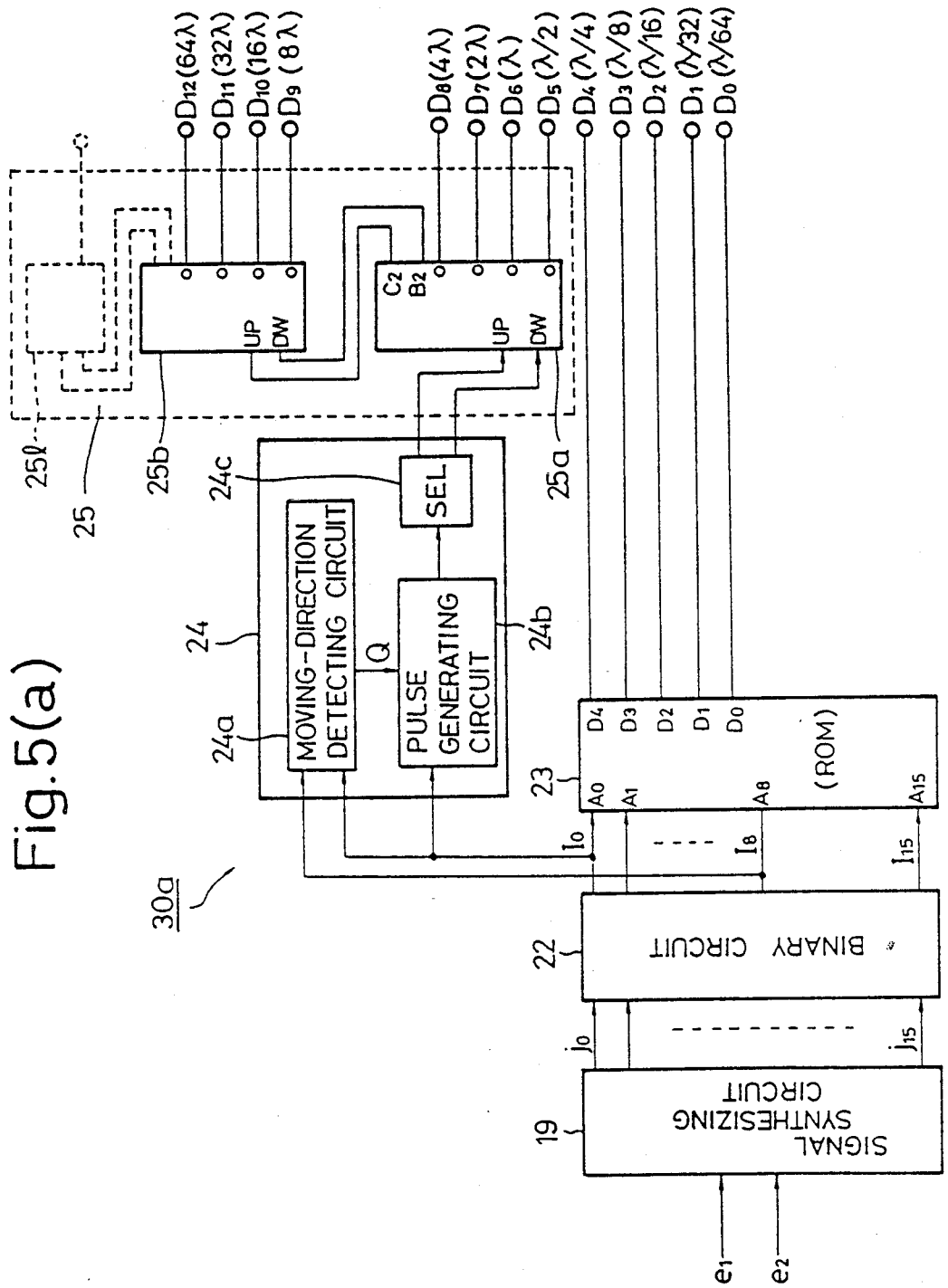
FIGS. 5(a), (b) are a block diagram of another laser length measuring instrument embodying the present invention and a timing chart relating to signals in principal parts for illustrating its operation, respectively.

FIG. 5(a) illustrates the principal part of another embodiment, wherein no switching operation corresponding to the speed of the moving object 5 is performed. In FIG. 5(a), an interference fringe counting circuit 30a comprises the signal synthesizing circuit 19 for receiving the signals $e_1$, $e_2$ from the interference wave signal generating circuit 12 of FIG. 3(a), a binary circuit 22 for converting the 16 signals $j_1$–$j_{16}$ of the signal synthesizing circuit 19 into respective binary values, a ROM 23, a count signal generating circuit 24, and a counter 25.

The ROM 23 receives the output signal of the binary circuit 22 as an address signal. The count signal generating circuit 24 receives signals $I_0$, $I_8$ in the form of binary values corresponding to the signals $e_1$, $e_2$, generates the pulse PA and applies it to a terminal on either the up count side (UP) or the down count side (DW) of the counter 25 in accordance with the moving-direction of the moving body.

The binary circuit 22 is such that the same circuit as the waveform shaping circuit 13 of FIG. 3(a) is provided correspondingly to the outputs of the sinusoidal waves $j_1$–$j_{16}$. Consequently, the signal $I_0$ of the binary circuit 22 is formed by subjecting the signal $e_1$ to waveform shaping and is similar to the signal $E_1$ of FIG. 3(b). The signal $I_8$ is similar to the signal $E_2$ likewise. Other signals $I_i$ (where $i =$ one of 1–7, 9–15) sequentially differ in phase by $\lambda/64$ from the signal $E_1$ or $E_2$, respectively.

The count signal generating circuit 24 comprises a moving-direction detecting circuit 24a, a pulse generating circuit 24b for generating a pulse at the time the signal $E_1$ rises and decays and a selector (SEL) 24c. The moving-direction detecting circuit 24a is similar to the moving-direction detecting circuit 14. The pulse generating circuit 24b operates to generate a pulse similar to the pulse PA by detecting the leading edge and trailing edge of the signal $E_1$. The selector 24c responds to the direction inversion signal Q of the moving-direction detecting circuit 24a to select UP or DW of the low order digit counter 25a of the counter 25 to send the signal thereto. In this case, 25b denotes a high order digit counter and as shown by a dotted line, an additional high order digit counter 25 1 may be provided.

By this means, the counter 25 counts with $\lambda/2$ as a unit with respect to the displacement of the moving object and generates measured data corresponding to the respective displacements at corresponding digit positions $D_5$–$D_{12}$.

Figure 5B:
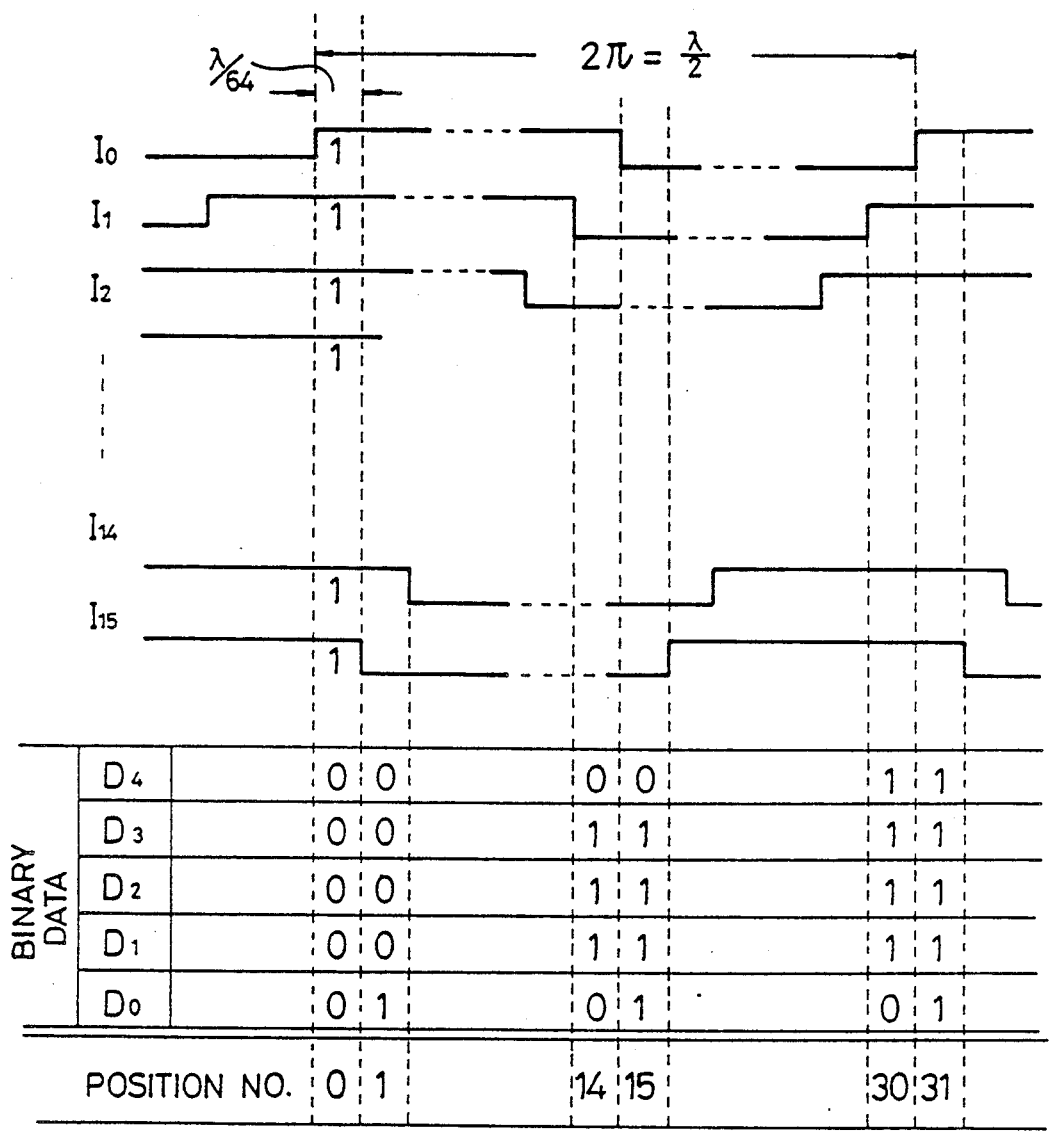

The ROM 23 is a memory having 64k address space for storing 5-bit data and generates a count signal corresponding to high resolution at less than $\lambda/2$. Address signals shown in FIG. 5(b) are applied to the ROM 23. As shown in FIG. 5(b), bits in view of waveforms subjected to pulse shaping in the vertical direction become access addresses of the ROM 23 from time to time. As shown therein, an access address when $I_0$–$I_{15}$ are all "1" is indicated as a position number "0" for convenience of illustration in connection with the correlated state of each waveform then. Such data that 5-bit data $D_0$–$D_4$ become all "0" is stored in the corresponding address (all 16-bit address signals correspond to "1").

When only $I_{14}$ becomes "0" subsequently, its position number is then set at "1" in accordance with the correlated state of each waveform. Data "0001" is stored in the corresponding address (only the high order bit is "0" and the remaining bits are "1"). "00001" in this case means a displacement of $\lambda \times 1/64$. This address signal is generated in conformity with the timing at which the pulse $I_{15}$ differing in phase by $\lambda\pi/64$ from the signal $I_0$ starts from the rise position. The timing at which the address signal is generated corresponds to when the displacement of the moving object 5 remains $\lambda/64$.

Each address signal is thus caught in accordance with the leading edge and trailing edge positions of each pulse signal likewise, so that data equivalent to the phase difference $\lambda/64$ is stored in the ROM 23.

In the above case, the 16-bit value is first reduced from all "1" to "0" sequentially from the high order at the address where $D_0$–$D_4$ are stored. There are 16 addresses which become all "0" and ranges from the position number "0" up to "15" corresponding to the correlated state of each waveform as shown on the lower side of FIG. 3(b). In addition, the address where $D_0$–$D_4$ are stored is such that all "1s" thereof are reduced to "0" sequentially from the high order. There are addresses ranging from the position number "15" up to "31" corresponding to the correlated state of each waveform. Consequently, it is only needed to store 32 bits of data in this case.

In this way, there can be generated the data on the displacements corresponding to the present mutual relations among the 16 waveforms generated as the moving object moves. The resolution ($\lambda/64 - \lambda/4$) is given correspondingly to the output at each digit position of $D_0$–$D_4$ of the ROM 23 shown in FIG. 5(a).

When these output values $D_0$–$D_4$ and the output values $D_5$–$D_{12}$ of the counter 25 are set in a register (not shown), for instance, and read to MPU, data on the displacement of the moving object is collected and processed by the MPU.

Since one measuring signal path for use in carrying the value shown by the high resolution ROM 23 is independent of another for use in carrying the value shown by the low resolution counter 25, the value of the counter 25 on the low resolution side remains unaffected even though an error occurs on the high resolution side. For this reason, no errors in the ROM 23 on the high resolution side are accumulated. In addition, no accumulate errors are produced as in the case of the conventional counter used as the ROM to generate data.

The acquisition of high resolution by forming a number of interference wave signals in the electronic circuit easily causes errors as the relations among the interference wave signals on the high resolution side tend to become uncertain. Therefore, consideration is given to the error produced in any pulse signal of the pulse signal train $I_0$–$I_{15}$.

Frequency of errors in the signals $j_1$–$j_{16}$ obtained from the signal synthesizing circuit 19 with respect to the basic signals $e_1$, $e_2$ relies on the number of additions and/or subtractions in the signal synthesizing circuit 13. As a result, the reliability of the signal train $I_0$–$I_{15}$ becomes unequal.

Among the signals having an accompanying character $j$, those marked with even numbers are most frequented by errors. This fact corresponds to $I_1$, $I_3$, . . . $I_{15}$ marked with odd numbers. Among the signals having the accompanying character j, $j_3$, $j_7$, $j_{11}$, $j_{15}$ are secondly frequented by errors and they correspond to $I_2$, $I_6$, $I_{10}$, $I_{14}$. $I_4$, $I_{12}$ follow them.

In the order in which the heavier probability of abnormality is shown, a case where either of $I_1$-$I_{15}$ bearing odd numbers is abnormal is defined as an abnormal level (A), another where either of $I_2$, $I_6$, $I_{10}$, $I_{14}$ is abnormal is defined as an abnormal level (B), and still another where either of $I_4$, $I_{12}$ is abnormal is defined as an abnormal level (C). In other words, the level (C) level (B) level (A) in terms of the reliability level. It is assumed $I_0$, $I_8$ are immune to abnormality since they are obtained directly from the basic signals $e_1$, $e_2$.

FIG. 6 is a table illustrating the relation between the addresses allotted to the ROM 23 in conformity with the aforementioned abnormal levels and the data stored. In this table, there are shown position numbers (0–31) corresponding to the correlated states of respective waveforms in a "NO." column, and signals whose bits are left undecided as to "1" or "0", because the state marked with x is abnormal.

In reference to addresses in the state left undecided as to "1" or "0", data $D_0$-$D_4$ corresponding to all the addresses of the ROM 23 which are selected by setting the position of x at "1" or "0" are set in $D_0$-$D_4$ columns on the right-hand side. When the data having an address at the low abnormal level is set, the data conforming to the addresses at which the data $D_0$-$D_4$ have already set with respect to those at the normal and abnormal levels are left untouched.

The data $D_0$-$D_4$ set on the right-hand side are set in such a manner that they correspond to the groups obtained by grouping the position numbers (0–31) corresponding to the correlated states of the respective waveforms in accordance with the abnormal levels (A), (B), (C). The grouping of the data $D_0$-$D_4$ is carried out by the integer multiplication of the resolution shown in the last column of the table.

There develops a numerical value integer times the resolution ($\lambda/32 - \lambda/8$) indicated for the moving object 5 at each abnormal level out of the position numbers (0 –31) corresponding to the correlated state of each waveform in the relevant group. The displacement at each abnormal level conforms to $\lambda/64$ x the value designated by the data $D_0$-$D_4$.

When an error is produced, the address in the ROM 23 is one of the addresses determined in conformity with the group of position numbers indicating the correlated state of each waveform; namely, it is determined in accordance with the level of the error being produced. As a result, the displacement corresponding to the error level is read out as the data $D_0$-$D_4$. By this means the measured data on rough resolution corresponding to the error level is obtainable even though an error is produced.

The counter 25 relies on the signal $I_0$ for counting. The count given by the counter 25 is therefore independent of the ROM 23 side which is high in resolution, and even though wrong data is produced on the ROM 23 side, it will not affect the value on the counter 25 side. The counter 25 keeps counting in accordance with the polarity inversion of the sinusoidal wave $e_1$ which is reliable, though low in resolution. Therefore, almost no accumulation of errors due to counting occurs. Moreover, the resulting measured data on the displacement is a combination of the values given by the counter 25 and the ROM 23, the measured data resulting therefrom representing a high resolution free from the accumulation of errors.

The reliability of the signals $e_1$, $e_2$ must be high in such an electronic circuit so as to generate the plurality of signals $j_1$-$j_{15}$ from the signals $e_1$, $e_2$ with the relationship shown in FIG. 4(a).

Figure 7A:
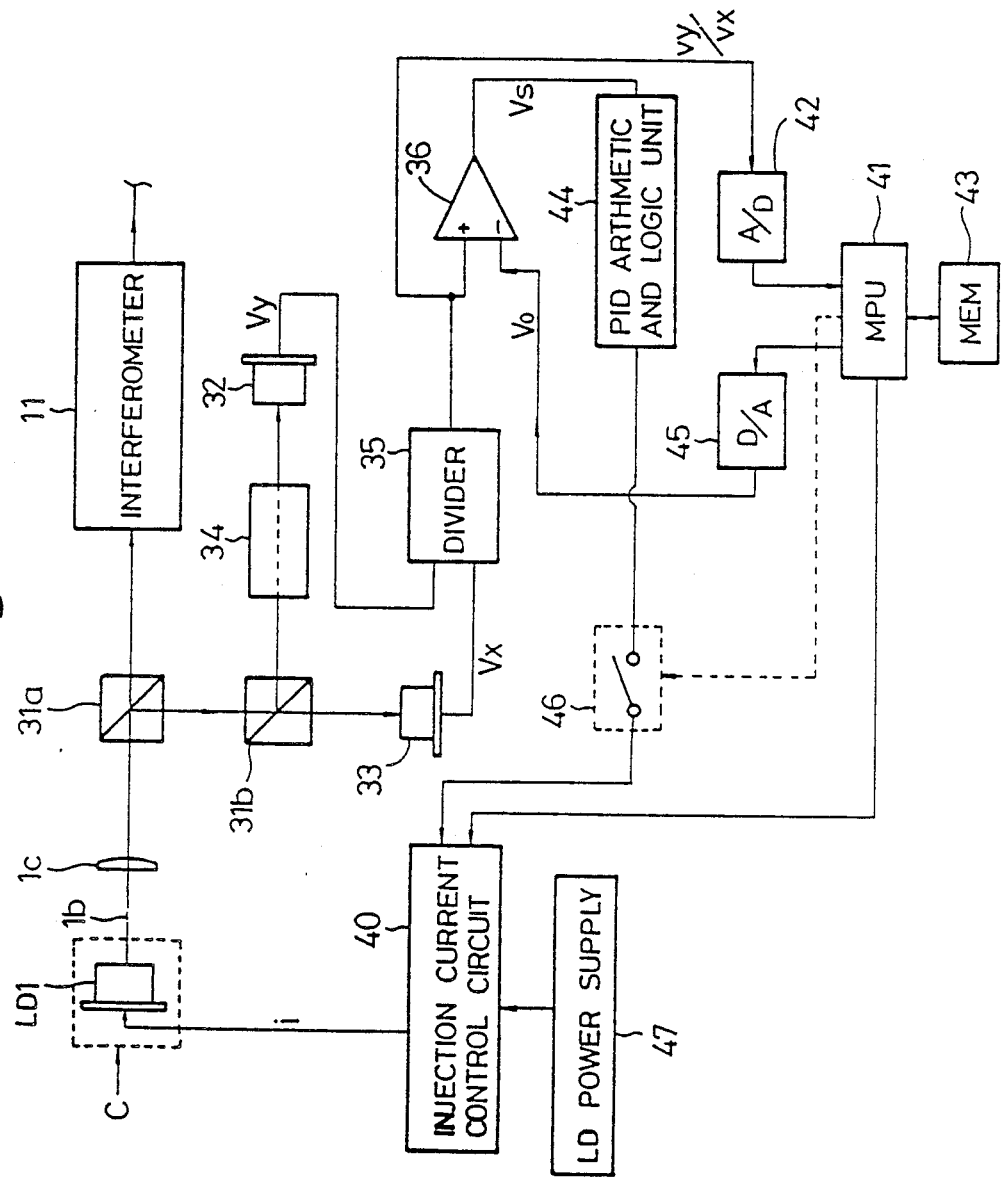
FIGS. 7(a), (b), (c) illustrate a control circuit for stabilizing the wavelength of a beam from a semiconductor laser element of the laser length measuring instrument embodying the present invention.

A control circuit of FIG. 7(a) is designed to stabilize the wavelength of LDI to increase the reliability of the signals $e_1$, $e_2$ further. The wavelength of the beam emitted from a laser diode (LD) fluctuates in proportion to the intensity of an injection current. Therefore, the injection current of the LD has heretofore been so controlled as to be made constant to reduce the fluctuation of the wavelength of the laser beam and to stabilize the wavelength.

A description will subsequently be given of an example in which the control process itself is the same as before. In FIG. 7(a), a laser beam source LD1 is controlled in terms of temperatures by a control signal C from a temperature control circuit (not shown), so that wavelength fluctuations against temperatures have been stabilized to a certain degree. A laser beam 1b from the LDI is supplied via a collimator lens 1c to a beamsplitter 31a.

One of the beams divided by the beamsplitter 31a is received by the beamsplitter 8 of the interferometer 11 shown in FIG. 2(a). The other beam thus separated is further divided by a beamsplitter 31b into two, one of which is then passed through a gas cell 34 where part of the wavelength thereof is absorbed. The beam whose wavelength has been absorbed partially is received by a light receiver 32, whereas the remaining beam is received by a light receiver 33 without being absorbed.

By receiving the beam passed through the gas cell 34, the light receiver 32 outputs a signal having a voltage vy proportionate to the fluctuation of the wavelength of the beam. The signal output of the voltage vy is added to an input on the dividend side of a divider 35. On the other hand, the light receiver 33 produces a signal having a voltage vx proportionate to the intensity of the beam. The signal output of the voltage vx is sent out to an input on the divisor side of the divider 35. As a result, the divider 35 carries out division on the voltages vy, vx to compute a voltage ratio vy/vx. A signal having this ratio indicates an absorptivity of the gas cell 34.

Conventionally, the value of the voltage ratio vy/vx is compared with a predetermined reference value in a comparator 36 to control an injection current control circuit 40. The injection current control circuit 40 then controls the current from a power supply (LD power supply) 47 of the laser diode to determine the current to be passed through the LD1. The wavelength is thus stabilized. However, the stabilization of the beam wavelength is not always accomplished sufficiently in a circuit for measuring interference fringes by causing 16 or more of interference wave signals using such an electronic circuit as stated above.

Figure 7B:
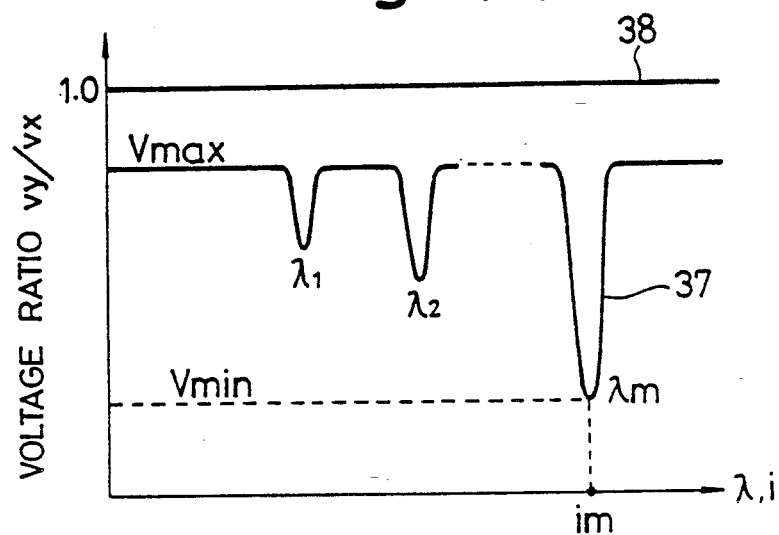

In the case of the circuit embodying the present invention as shown in FIG. 7(a), use can be made of a reference value Vo conforming to the wavelength absorptive characteristics of the gas cell 34. As shown in FIG. 7(b), the characteristics (absorption factor of the gas cell 34) of the voltage ratio vy/vx in comparison with the wavelength $\lambda$ produced by the divider 35 normally have a plurality of absorption lines $\lambda_1, \lambda_2 \ldots \lambda_m$.

Particularly when rubidium (Rb) is encapsulated in the pipe of the gas cell 34, the aforementioned characteristics are exhibited. As is obvious from the characteristics, a maximum absorption line 37 having a wavelength of λm among others actually contributes to the absorption of the laser beam to a large extent.

When the wavelength of the laser beam is controlled by attaching importance to the maximum absorption line 37 with the intermediate point between the maximum and the minimum value as a reference, relatively linear, highly sensitive control can be exercised over the vertical variation of the wavelength.

Figure 8:
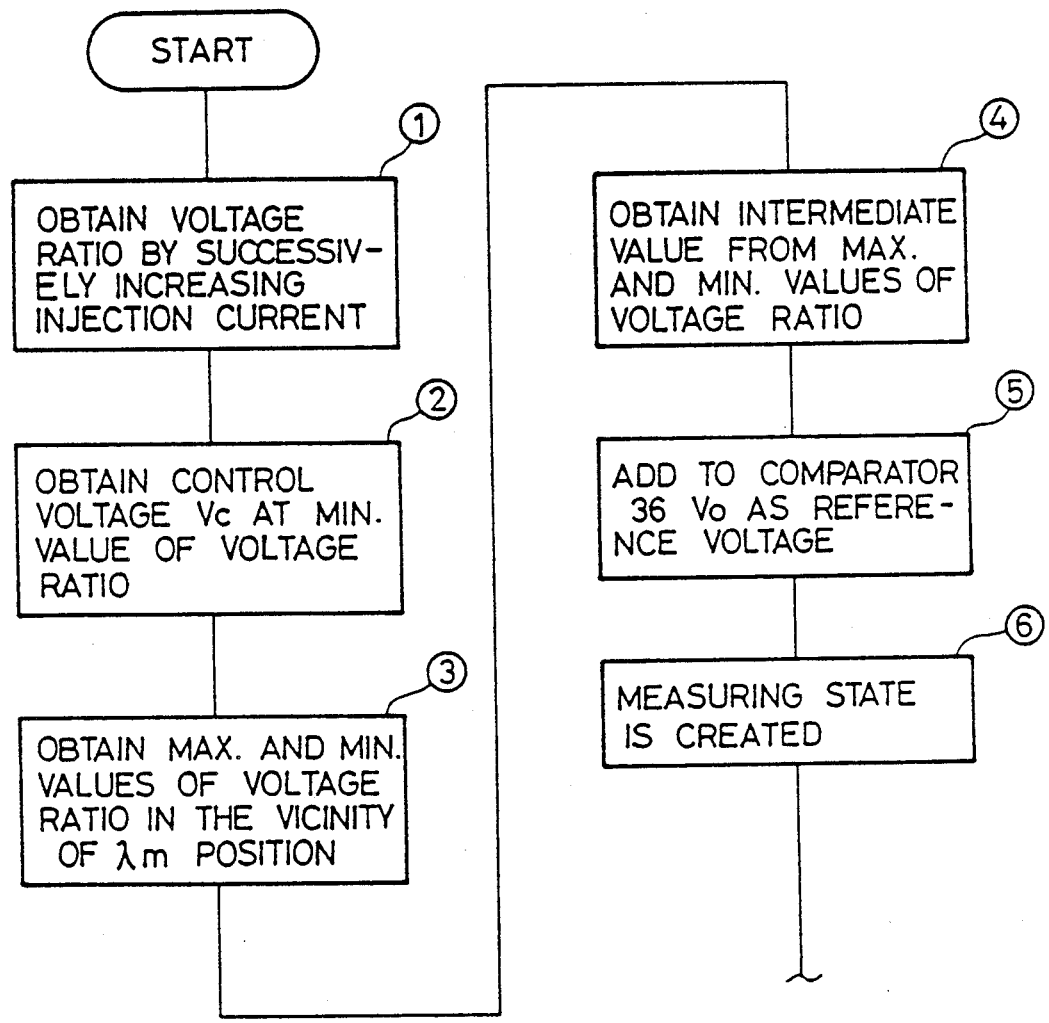
FIG. 8 is a flowchart illustrating the process of setting up a reference voltage.

In this case, a process is made of searching for the position of the wavelength λm which is to become the greatest absorption factor in harmony with the gas cell beforehand to find out the intermediate point between the maximum and the minimum value of the ratio. FIG. 8 shows a process flowchart.

In Step 1, a microprocessor (MPU) 41 controls an injection current control circuit 40 to obtain the absorption line 37 having a wavelength of λm, causing the LD1 to sequentially increase the injection current. An oscillation wavelength λ of the LD1 thus gradually increases. Simultaneously, the MPU 41 receives the output (voltage ratio vy/vx) of divider 35 via an A/D converter circuit (A/D) 42. In Step 2, the minimum value is detected and control voltage corresponding to an injection current value im then is stored in a memory (MEM) 43.

Figure 7C:
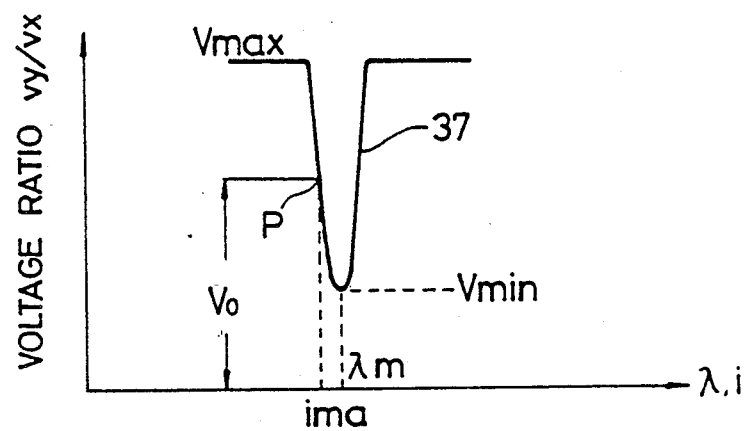

In Step 3, the maximum and the minimum voltage ratio $v_{max}$, $v_{min}$ of the maximum absorption factor curve 37 are subsequently detected by increasing and decreasing the current value in the vicinity of the position of the wavelength λm as shown in FIG. 7(c). In Step 4, a central value Vo is computed from these values and stored in the memory 43. Given that the voltage value Vo is that of control voltage, the current value to be injected into the LDI is assumed to be a reference injection current value ima.

The reference injection current ima corresponds to the central point p (FIG. 7(c)) of an inclined straight line on this side of the absorption line 37 having a wavelength of λm, despite the downturn of a line 38 (FIG. 7(b)) as viewed from the voltage ratio vy/vx=1.

In Step 5, the MPU 41 gives the comparator 36 the voltage value Vo via a D/A converter circuit (D/A) 45 as a comparative reference voltage.

In Step 6, the MPU 41 turns on a switch circuit 46 and enters into measurement. At this time, the output of the comparator 36 is such that an output of difference voltage VS in conformity with a difference from the reference voltage Vo is generated before being applied to a PID arithmetic and logic circuit 44.

The control voltage obtained as a result of PID calculation in conformity with the difference voltage VS in the PID arithmetic and logic circuit is supplied via the switch circuit 46 to the injection current control circuit 40. The injection current of LDI is thus placed under feedback control so that it has the reference injection current value ima. The oscillation wavelength of the LD1 is stabilized in this way. Not only the interference wave signal but also measurement accuracy is improved thereby.

The PID calculation (=proportional integral differential calculus operation) in the PID arithmetic and logic circuit 44 is a general automatic control technique and has been added only to exercise high-speed response control over the difference voltage VS. Consequently, it is not always necessary to insert the PID arithmetic and logic circuit 44. Moreover, a device for performing the PID calculation process has been developed and the provision of high-speed control becomes possible if such a device is employed for the PID arithmetic and logic circuit 44.

In spite of the above-described arrangement, the pulse corresponding to the zero-cross point of the signal $e_1$ generated in the pulse detecting/synthesizing circuit 20 may be utilized as what is generated from the polarity inversion detecting circuit 16 in the embodiment shown in FIG. 3(a). Therefore, the polarity inversion detecting circuit 16 is not necessarily required. In addition, the pulse PA can also be obtained by detecting the leading edge and trailing edge of the signal $E_1$ of the waveform shaping circuit 13.

The moving-direction detecting circuit 14 has been used only as one of the examples and use can also be made of the pulses indicating the zero-cross points corresponding to the signals $e_1$, $e_2$ obtained in the pulse detecting/synthesizing circuit 20.

Although the signal $e_1$ has been allotted to what is used to obtain the low resolution measuring pulse in the embodiment shown, the signal $e_1$ may be replaced with $e_2$. Moreover, the λ/4 measuring pulse may be generated from the signal resulting from subjecting the signals $e_1$, $e_2$ to addition and subtraction for the purpose.

We claim:
1. A laser length measuring instrument comprising:
an interferometer having a fixed mirror for producing a plurality of interference wave signals by emitting a laser beam derived from a laser beam source to a moving mirror fitted to a moving object and said fixed mirror, making a measurement and a reference beam respectively reflected therefrom interfere with each other to generate a plurality of interference waves different in phase, and detecting the plurality of interference waves by means of corresponding light receivers,
a phase difference signal generating circuit for receiving the plurality of interference wave signals from said interferometer to generate a first and a second sinusoidal wave interference signal differing in phase by $\pi/2$, and generating a plurality of third sinusoidal wave interference signals differing in phase by $m\pi/2m$ (where n=integer 2 or greater; and m=positive integer sequentially selected from among $0 < m\pi/2n < \pi$) from the first sinusoidal wave interference signals in phase with the second wave interference signal sin phase with the second sinusoidal wave interference signal, by adding the first and the second sinusoidal wave interference signals to an addition and a subtraction circuit,
a first polarity inversion signal generating circuit for receiving the first and the second sinusoidal wave interference signals, and the plurality of third sinusoidal wave interference signals respectively generated from said phase difference signal generating circuit, and generating signals for indicating polarity inversion of corresponding sinusoidal wave interference signals from the respective sinusoidal wave interference signals in accordance therewith, and
a displacement generating circuit for selectively independently receiving first and second signals, said first signal being obtainable according to one of said first or second sinusoidal wave interference signals from the sinusoidal wave interference signals generated therein, the first signal having a first resolution with respect to the measuring displacement of the moving object and indicating polarity inversion, and said second signal being obtainable respectively according to the first and the second sinusoidal wave interference signals and the plurality of third sinusoidal wave interference signals, the second signal having a second resolution higher than the first resolution with respect to the measuring displacement of the moving object and indicating polarity inversion, wherein the displacement of said moving object is measured in conformity with the resolution indicated by the first or second signal thus received, said first and second resolutions corresponding to interference fringe counting resolutions of said interferometer.

2. A laser length measuring instrument as claimed in claim 1, wherein said laser beam source is a semiconductor laser element, wherein said polarity inversion signal generating circuit receives the first and the second sinusoidal wave interference signals and the plurality of third sinusoidal wave interference signals respectively generated by said phase difference signal generating circuit and generates a detection pulse as a signal for indicating said polarity inversion, depending on the polarity inversion position of each sinusoidal wave interference signal, and wherein said displacement generating circuit includes a counter for counting the number of detection pulses in accordance with said detection pulse of said polarity inversion detecting circuit, said counter receiving said detection pulse corresponding to the first resolution at a high order digit position corresponding to said first resolution and said detection pulse corresponding to the second resolution at a low order digit position corresponding to said second resolution.

3. A laser length measuring instrument as claimed in claim 2, wherein said counter is an up/down counter, and wherein said instrument is provided with a moving-direction detecting means for detecting the movingdirection of said moving object, on receiving one of the first and the second sinusoidal wave interference signals, and a signal converted into a pulse from the first and second sinusoidal wave interference signal, whereby the count direction of said up/down counter is switched according to the result detected by said movingdirection detecting means.

4. A laser length measuring instrument as claimed in claim 2, wherein said instrument is further provided with a parallel/serial converter circuit for converting the received detection pulse corresponding to said second resolution to a serial detection pulse, and wherein said counter receives said serial detection pulse via said parallel/serial converter circuit.

5. A laser length measuring instrument as claimed in claim 4, wherein said instrument is provided with a first moving-speed detecting circuit for detecting the speed of said moving object by counting said detection pulses corresponding to said first resolution for a predetermined period of time, and wherein said counter receives said detection pulses from said parallel/serial converter circuit in accordance with the signal detected by said moving-speed detecting circuit when the speed of said moving object is lower than a preset speed and said detection pulse with the first resolution when the speed of moving object is higher than the preset speed.

6. A laser length measuring instrument as claimed in claim 5, wherein said instrument is provided with a second polarity inversion detecting circuit for receiving one of the first sinusoidal wave interference signal and the second sinusoidal wave interference signal and generating a polarity inversion detection signal in accordance with the sinusoidal wave interference signal received, and wherein the signal indicating said polarity inversion having the first resolution to be sent to said displacement generating circuit is said detection signal of said second polarity inversion detecting circuit.

7. A laser length measuring instrument as claimed in claim 6, wherein said instrument is provided with a second moving-speed detecting circuit for detecting the speed of said moving object by counting the signals detected by said second polarity inversion detecting circuit for a predetermined period of time, and wherein said counter receives said detection pulse from said parallel/serial converter circuit in accordance with the signal detected by said first moving-speed detecting circuit when the speed of said moving object is lower than the preset speed and said detection pulse with the first resolution when the speed of said moving object is higher than the preset speed.

8. A laser length measuring instrument as claimed in claim 1, wherein said laser beam source is a semiconductor laser element, wherein said first polarity inversion signal generating circuit receives the first and the second sinusoidal wave interference signals and the plurality of third sinusoidal wave interference signals respectively generated by said phase difference signal generating circuit, converts each sinusoidal wave interference signal into a pulse and generates a pulse for making the leading edge and trailing edge of a preceding pulse a signal indicating said polarity inversion, and wherein said displacement generating circuit includes a counter for receiving said pulse from said polarity inversion detecting circuit and counting the number of pulse leading edges and trailing edges, wherein the pulse responding to the leading edge and trailing edge of said pulse corresponding to the first resolution is received at a high order digit position, and wherein the pulse responding to the leading edge and trailing edge of said pulse corresponding to the second resolution is received at a lower order digit position.

9. A laser length measuring instrument as claimed in claim 8, wherein said counter counts the number of leading edges and trailing edges in response to the pulse having the lading edge and trailing edge corresponding to the first resolution among said pulses from said polarity inversion detecting circuit, and further comprises a ROM for receiving the pulse having the leading edge and trailing edge corresponding to the second resolution among said pulses as an address signal, the measured data corresponding to the second resolution being stored in said ROM.

10. A laser length measuring instrument as claimed in claim 9, wherein said ROM stores the data corresponding to respective abnormal occurrence probabilities of the plurality of third sinusoidal wave interference signals obtained from said phase difference signal generating circuit.

11. A laser length measuring instrument as claimed in claim 2, wherein said instrument is provided with a control circuit for stabilizing the wavelength of the laser beam from said semiconductor laser element, and wherein said control circuit receives via a gas cell one of the laser beams obtained by dividing the laser beam from said semiconductor laser element into two, receives the other substantially unaltered to obtain the ratio of intensity of one laser beam to that of the other according to the signals received, and compares the ratio wit a reference value to stabilize the wavelength of a current to be passed through said semiconductor laser element by controlling the current in conformity with the result compared, said reference value being set at the middle point between the maximum and the minimum value of the ratio of said intensity produced in accordance with the wavelength of the minimum absorption line of said gas cell.

* * * * *